United States Patent [19]

Stolfi

[11] Patent Number: 4,722,592

[45] Date of Patent: Feb. 2, 1988

[54] MOTORIZED-AXIS-ANGULAR FINE ADJUSTMENT PRISM MOUNT

[75] Inventor: Eugene J. Stolfi, Corning, N.Y.

[73] Assignee: The United States of America as represented by the Secretary of the Army, Washington, D.C.

[21] Appl. No.: 947,147

[22] Filed: Dec. 29, 1986

[51] Int. Cl.[4] .............................................. G02B 7/18
[52] U.S. Cl. .................................................. 350/287
[58] Field of Search ................ 350/287, 637; 372/100

[56] References Cited

U.S. PATENT DOCUMENTS 4,381,884  5/1983  Houle ................................. 350/287

Primary Examiner—Bruce Y. Arnold
Assistant Examiner—Terry S. Callaghan
Attorney, Agent, or Firm—Freddie M. Bush; James T. Deaton

[57] ABSTRACT

A two-axis angular fine adjust mount includes a one piece flexible diaphragm that has an inner portion with mounting means for a prism on one side and means on an opposite side for actuating or adjusting the prism. The inner portion is connected in relation to an intermediate flexible portion which is connected to an outer support section for mounting the flexible diaphragm relative to a base. The outer support section also providing for mounting actuator means for actuating the opposite side of the inner portion which adjusts the prism to an accurate and precise position.

4 Claims, 2 Drawing Figures

MOTORIZED-AXIS-ANGULAR FINE ADJUSTMENT PRISM MOUNT

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

In the past, laser systems have required ultra precise alignment to maintain peak power and accuracy. In laboratory experiments of laser optics, a system precisely aligned which is left to sit over night will usually drift off target. This can be caused by a variety of reasons which include slight changes in temperature or humidity. The accuracy required to be maintained is difficult in a laboratory much less on a mobile instrument without automatic boresight. The amount of movement required for auto boresight is so fine that standard mechanisms with sliding surfaces do not work. Surface texture and break-away friction cause the mirrors to move uncontrollably. Therefore, an accurately controllable mount that has precise adjustment is needed.

With the above need in mind, it is an object of this invention to provide a novel devise that improves the state-of-the-art in terms of sensitivity and stability of mechanised prism mounts.

Another object of this invention is to provide a highly stable 2-axis angular adjust prism mount which is sensitive enough for auto boresight with a range of plus or minus 0.75 milliradians (1.5 milliradians total travel) and 10 microradians resolution.

Still another object of this invention is to provide a device that uses leverage to increase sensitivity, pivot points to transfer motion, and a one piece machined diaphragm flexure to move a prism smoothly and predictably while maintaining stability during extremely fine 2-axis angular adjustments.

A further object of this invention is to provide a diaphragm flexure which has the center of rotation close to the reflective surface of a prism mounted thereon to reduce translational error.

Still a further object of this invention is to provide an adjusting mechanism that utilizes a flexing member that has a reduction in the overall size of the adjusting device over the prior arrangements.

Other advantages of this invention will be obvious to those skilled in this art.

SUMMARY OF THE INVENTION

In accordance with this invention, a 2-axis-angular fine adjustment prism mount is provided in which a diaphragm flexure member of a one piece part has a prism mount on one side and a shaft and pivot arrangement mounted on the other side with actuating means for adjusting the pivot arrangement and in turn the prism on the prism mount about two axis to accurately adjust a prism on the prism mount.

DESCRIPTION OF THE PREFERRED EMBODIMENT

Figure 1:
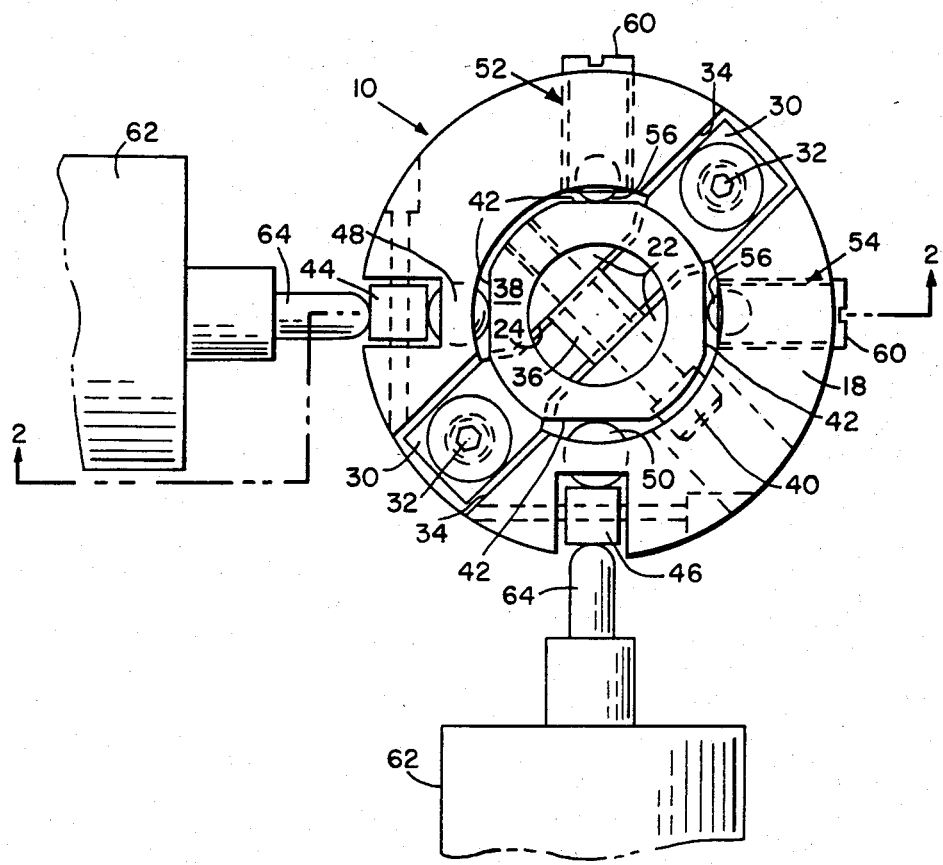
FIG. 1 is a top view of the prism mount according to the invention.
Figure 2:
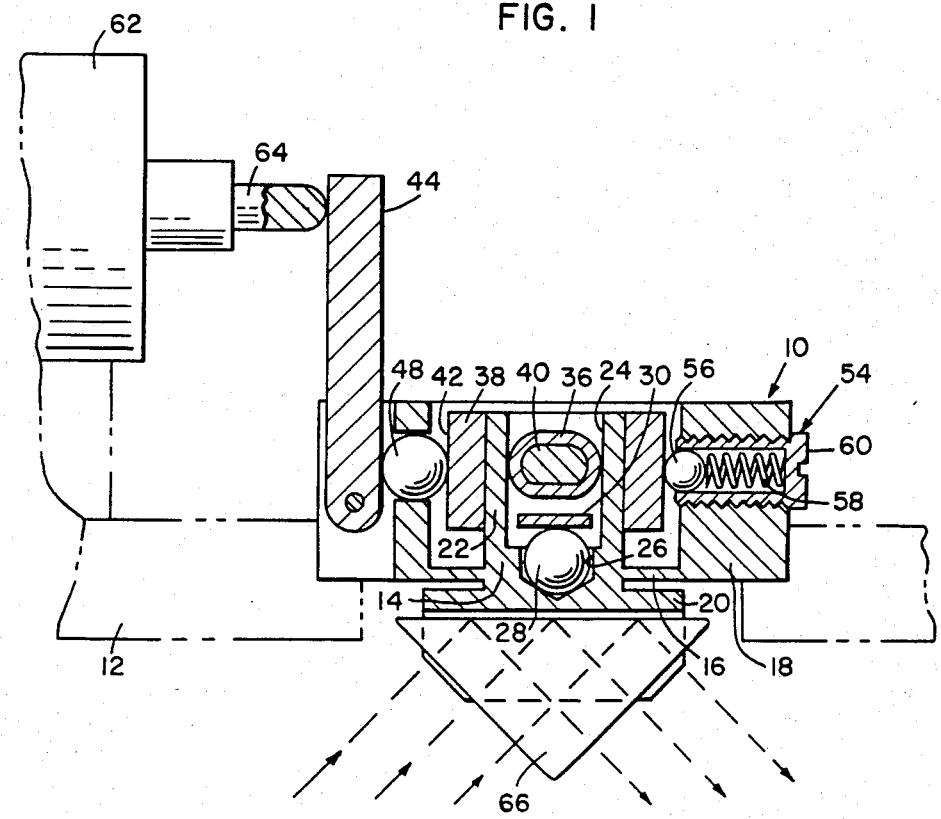
FIG. 2 is a sectional view along line 2—2 of FIG. 1.

Referring now to the drawing, a flexure diaphragm 10 is secured in a conventional manner to base structure 12. Flexure diaphragm 10 includes an inner section 14, and intermediate section 16 that flexes, and an outer section 18. Inner section 14 has a prism mount 20 to one side and a shaft tiller arrangement 22 at the other side. Shaft tiller arrangement 22 has a slit 24 therethrough and a bore 26 at the base thereof. A ball bearing 28 is positioned in bore 26 and a strap 30 applies pressure to ball 28 and straps the ball in position to establish a pivot near the base of prism mount 20. Strap 30 is secured in position at opposite ends by securing means 32 that secure the ends of strap 30 in cut out grooves 34 of outer section 18. Securing means 32 are conventional structures such as bolts. Strap 30 secures precision ball bearing 28 in position and establishes a pivot and center of rotation for the diaphragm which pivot is near the base of prism mount 20. The established pivot is also at the center of flexible of diaphram 10. Inner members 22 have a bushing 36 press fitted there between and a tiller ring 38 is press fitted over the outer surfaces of members 22. A bolt 40 clamps tiller ring 38 and bushing 36 in position relative to members 22 as illustrated to equal one piece construction. Tiller ring 38 has 4 flat surfaces 42 located 90° apart about the periphery thereof and surfaces 42 are hardened and polished to provide surfaces for pivot point pressure application thereto. Outer section 18 has pivot arms 44 and 46 pivotly mounted thereon as illustrated and precision ball bearings 48 and 50 are mounted in outer section 18 as illustrated and between pivot arms 44 and 46 surfaces 42 on tiller ring 38. Outer section 18 has spring arrangements 52 and 54 mounted therein with spring arrangement 52 directly opposite lever 46 and spring arrangement 54 directly opposite lever 44. Each of spring arrangements 52 and 54 has a precision ball bearing 56 that contacts a hardened surface 42 and ball bearings 56 are biased by springs 58 that are positioned between a precision ball bearing 56 and an adjusting screw 60 that is adjustably mounted in outer section 18 as illustrated. Electric stepping micrometer drive motors 62 are mounted on base 12 in a conventional manner and drive through an extremely high gear ratio reduction gear so that the reduction gear acts as automatic breaking when the power is off and this reduction gearing insures that the fixture or diaphragm will remain at the last setting adjusted to. Each motor 62 drives through reduction gearing inside the motor housing to drive shaft 64 back and forth to act on lever 44 or 46 which acts through bearing 48 or 50 to adjust the diaphragm against the action of one of springs 58 depending upon which motor 62 is being actuated. Springs 58 act to apply force against tiller ring 38 and oppose forces applied through pressure transfer ball bearings 48 and 50 and lever arms 44 and 46. This produces zero backlash through the entire mechanism and springs 58 also operate the tiller ring arrangement over center as lever arms 44 and 46 are backed off. Lever arms 44 and 46 pry against pressure transfer ball bearings 48 and 50 and multiply the sensitivity and force of the stepping motor drive micrometers.

A conventional prism or mirror 66 is mounted on prism mount 20 in a conventional manner. Three lapped pads usually support prism 66 and spring clips are used to clip over the prism and pads in a conventional manner.

In operation, with a mirror or prism mounted on prism mount 20 and with the flexible diaphragm 10 in position relative to a base such as 12, motors 62 are used to drive through their reduction gearing to drive shafts 64 to adjust lever arms 44 and 46 as desired to apply pressure through ball bearings 48 and 50 to apply pressure to tiller ring 38 against the bias of springs 58 to adjust the flexible intermediate section 16 of the flexible diaphragm and thereby adjust the prism about the pivot produced from the action between bearing 28 and the bore within the inner section. As will be appreciated, the flexible diaphragm can be adjusted back and forth to compensate for any changes in the positioning of the prism or mirror as desired within limits. Flexible diaphragm 10 is generally a one piece type construction with a diameter of approximately two inches and a thickness of about one inch. With a flexible diaphragm of this size, the diaphragm can be flexed about 1.5 milliradians total travel. That is, the flexible diaphragm can be adjusted plus or minus 0.75 milliradians.

Advantage of the flexure diaphragm of this invention is the ability to establish the center of rotation for the flexure diaphragm close to the reflective surface of the prism or mirror mounted thereon and thus reduce translational error. Also, the 2-axis angular adjustment of the device is on the same flexing member and this also reduces the size of the device required. It is also noted that this device uses leverage to increase sensitivity, pivot points to transfer motion, and a one piece machined flexure to move a prism or mirror smoothly and predictably, while maintaining stability during extremely fine 2-axis angular adjustments.

I claim:

1. A 2-axis angular fine adjust mount comprising a flexible diaphragm having an inner central portion, and intermediate flexible portion and an outer support section, said inner central portion having a prism mount section on one side of said central portion and an actuator portion opposite said mount section with actuator means mounted relative thereto for causing said intermediate section to flex and adjust said mount section about two axes.

2. A 2-axis angular fine adjust mount as set forth in claim 1, wherein said actuator portion has a slit and a bore at the base of said slit, a precision ball bearing mounted in said bore and contacting the end surface thereof, and a strap mounted across said precision ball bearing and being secured to said outer support section to apply pressure to said precision ball bearing in order to provide a pivot for said flexible diaphragm.

3. A 2-axis angular fine adjust mount as set forth in claim 2, wherein said actuator portion includes a tiller ring mounted thereabout with a spacer mounted in the slit of said actuator portion and a bolt securing said tiller ring and spacer together to form an intergral type structure, said tiller ring having four equally spaced flat surfaces about the periphery thereof and said actuator means including a pair of lever arrangement means mounted on said outer support section and acting through ball bearings mounted in said outer support section to apply force on two of said flat surfaces of said tiller ring, and the other two surfaces of said tiller ring having ball bearings pressed thereagainst by spring biasing means, said spring biasing means acting in opposition to forces applied at said levers.

4. A 2-axis angular fine adjust mount as set forth in claim 3, wherein said actuator means further includes stepping motors mounted relative to said levers with each stepping motor having reduction drive gearing and an actuator shaft which contacts one of the levers, said stepping motors being micrometer driven and having reduction drive gear ratios such that the gears act automatically to brake said actuator shafts in the position to which they are actuated.

* * * * *